Dec. 16, 1958 B. M. HARRISON 2,865,019
MEASURING AIRCRAFT COURSE AND GROUND SPEED SYSTEMS
Original Filed Nov. 10, 1944 2 Sheets-Sheet 1

INVENTOR.
BERTRAM M. HARRISON
BY
HIS ATTORNEY

Dec. 16, 1958     B. M. HARRISON     2,865,019
MEASURING AIRCRAFT COURSE AND GROUND SPEED SYSTEMS
Original Filed Nov. 10, 1944     2 Sheets-Sheet 2
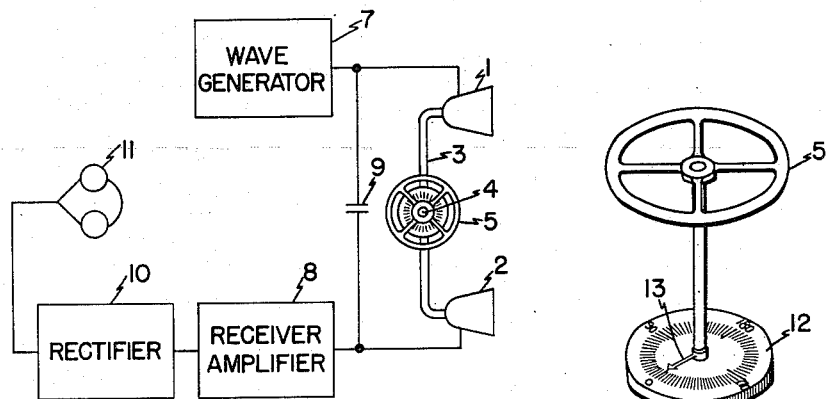
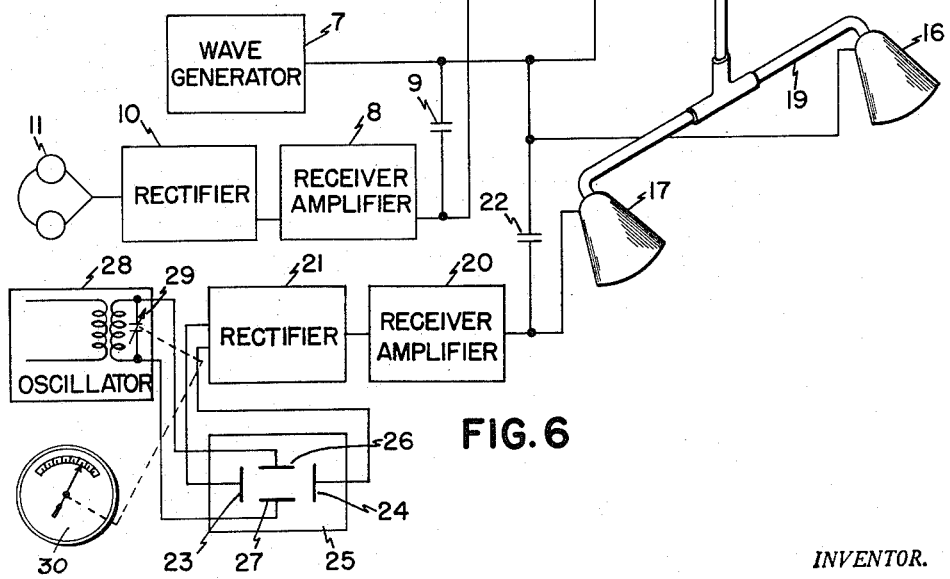
INVENTOR.
BERTRAM M. HARRISON
BY
HIS ATTORNEY United States Patent Office 2,865,019
Patented Dec. 16, 1958

2,865,019

MEASURING AIRCRAFT COURSE AND GROUND SPEED SYSTEMS

Bertram M. Harrison, Wellesley Hills, Mass.

Continuation of application Serial No. 562,873, November 10, 1944. This application January 16, 1956, Serial No. 559,379

6 Claims. (Cl. 343—8)

This is a continuation of my copending application, Serial No. 562,873, filed November 10, 1944, now abandoned.

The present invention relates to a method and apparatus for determining the true course and ground speed of aircraft in flight.

Figure 2:
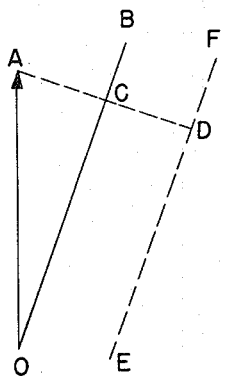
Figure 3:
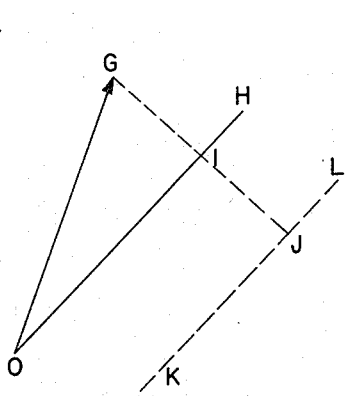
Figure 4:
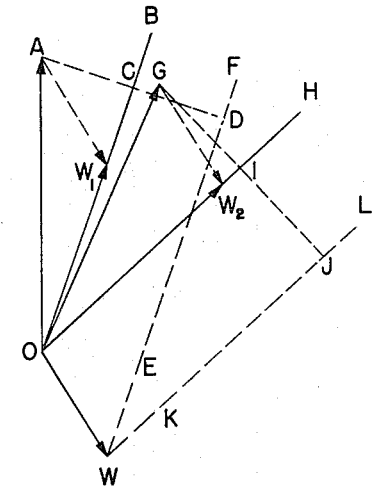
Figure 1:
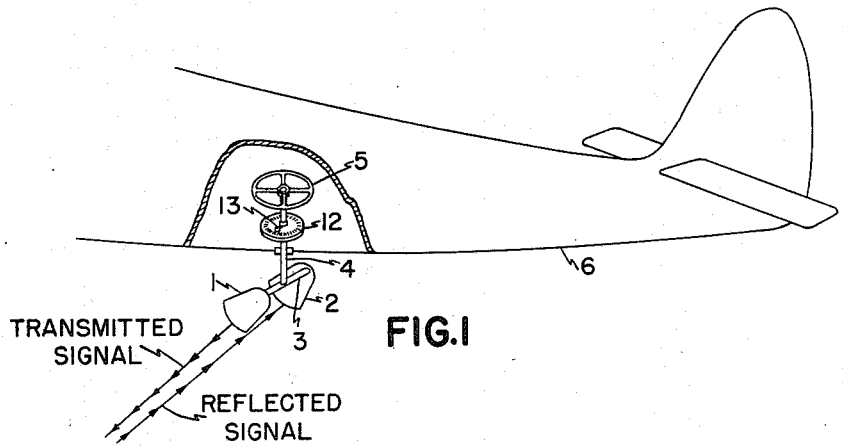

My invention will best be understood from the following description taken in connection with the accompanying drawings in which Fig. 1 shows one modification of a portion of the apparatus installed on an aircraft; Figs. 2, 3 and 4 are vector diagrams illustrating the operation of my method; Fig. 5 is a schematic diagram of a modification of the invention; and Fig. 6 is a schematic diagram of a further modification of the invention.

In order to determine the ground speed of aircraft I make use of the well-known Doppler principle according to which the frequency of received wave energy is greater than the frequency of the source of such wave energy when the receiving station and the transmitting station are approaching each other, and is less than the frequency of the source when the transmitting station and the receiving station are moving away from each other.

Generally stated, I transmit from an aircraft high frequency electromagnetic wave radiations at an angle toward the ground and receive reflected waves. If the transmitter and receiver units are directive and so positioned on the aircraft as to be aimed transversely to the line of flight, the frequency difference between transmitted and reflected waves, due to the Doppler effect, will be zero, whereas, if the transmitter and receiver units be aimed parallel to the line of flight, there will be a maximum difference in frequency between the transmitted and reflected waves, the amount of which is directly proportional to the speed of the airplane. Therefore, the direction of the plane, that is, the true course with respect to the ground, can be determined with respect to the fore and aft line of the plane by determining the direction in which a wave transmitter and receiver must be positioned for either zero or maximum frequency difference between transmitted and reflected waves.

Similarly, the true speed of the plane over the ground can be determined from a measure of the maximum difference in frequency between transmitted and reflected waves. The latter problem can be simplified somewhat if the speed of the plane relative to the air is known, for example, by means of an air speed indicator.

Commencing with the simplest arrangement, Fig. 1 shows an electromagnetic wave radiator 1 and a receiver 2 mounted on the airplane 6. The transmitter and receiver each consists of a suitable antenna mounted in a parabolic reflector, although any other suitable radiating and receiving elements may be used. The transmitter 1 and the receiver 2 are mounted on a support 3 which is rotatable about a normally vertical axis. The support 3 may thus be mounted on a shaft 4 rotatable by a hand wheel 5. The transmitter and receiver are shown projecting below the body 6 of the airplane with the hand wheel 5 within the plane. It will be obvious, however, that the transmitter and receiver may, if desired, be positioned with the plane, provided suitable apertures, or "windows," transparent to the electromagnetic wave radiations, are provided.

As schematically shown in Fig. 5, the transmitter 1 is connected to a wave generator 7. This may be an impulse generator or preferably a continuous wave generator. Any conventional type of wave generator having the required definite frequency characteristics may be used. The receiver 2 is connected to a receiver amplifier 8 which may likewise be of conventional design. The receiver amplifier 8 is also connected to the wave generator through a condenser 9 or some other suitable means whereby a small part of the generated frequency may be introduced into the receiver amplifier together with the signal received by the receiver 2. Beats will thus be produced between the transmitted and received frequencies. These are rectified by the rectifier 10 and may be heard in the telephones 11.

When the line of antennae 1, 2, that is, the support 3, is rotated into a position in which it is at right angles to the actual direction of the motion of the plane with respect to the ground, the difference in frequency between the transmitted signal and the reflected signal will be a maximum and the sound heard in the telephones 11 will have the highest pitch. As the line of antennae is rotated away from this position the pitch of the sound in the telephones will decrease until, when the line of antennae is parallel to the true course of the plane, the sound will disappear altogether. This direction can be determined from a dial 12 fastened to the body of the aircraft and a cooperating pointer 13 secured to the shaft 4. Thereby the direction of the true course with reference to the fore and aft axis of the plane is determined.

The ground speed of the plane can now also be found in the following manner.

If the above information be plotted as shown in Fig. 2, the vector OA may be drawn to represent the air speed and direction of the plane as determined from an air speed indicator and a compass, and the line OB may be drawn in the direction determined for the true course. Now, since ground speed is the vector sum of air speed and the wind, it follows that the diagonal of a parallelogram of forces lies along the line OB. If we now draw line AD perpendicular from OB to A and set distance CD equal to the distance AC and draw line EF parallel to line OB, it is evident that one corner of the parallelogram must lie somewhere along the line EF.

The course of the plane is now changed and the true ground course observation is repeated by rotating the antenna assembly. From the new observations another vector diagram can be drawn as in Fig. 3. OG will represent the new air speed and direction, with the line OH representing the new true course, whereby, making a similar construction to that described for Fig. 2, it is determined that one corner of the parallelogram of forces must lie along the line KL.

The diagrams of Figs. 2 and 3 are now superimposed as shown in Fig. 4, whereby we have two parallelograms, each having one side in common with one side of the other, that is, the wind in each case is the same. Consequently, the intersection of the lines EF and KL as shown at W in Fig. 4 determines the length and direction of the vector OW which corresponds to the wind speed and direction.

Laying off the vector OW from the point A as $AW_1$, the ground speed as well as direction of the plane in the case of Fig. 2 is determined by the vector $OW_1$. Similarly, laying off the vector OW from the point G as the vector $GW_2$, the true course and ground speed of the plane in the case of Fig. 3 is determined by the vector $OW_2$. Since the wind at high altitudes maintains direction and force constant for comparatively long periods of time, the vector OW can be applied to any speed and course and the true ground speed and course rapidly determined by making a single additional true course observation.

However, in order to avoid the necessity of plotting vector diagrams, I have shown in Fig. 6 a modified arrangement whereby not only the true course but also the ground speed can be determined by instrumental observation without reference to an air speed indicator. In this modification two sets 14, 15 and 16, 17 of transmitting and receiving antennae are employed. The set 14, 15 is mounted on a normally horizontal support 18 and the set 16, 17 is similarly mounted on a normally horizontal support 19 which, however, is at right angles to the support 18. Both of these supports are mounted on the rotatable shaft 4 operable by a hand wheel 5 as in Fig. 5. Similarly, a calibrated dial 12 and pointer 13 may be provided. In this case the dial may be arranged so that the pointer 13 points to zero degrees when the antenna set 14, 15 is parallel to the fore and aft axis of the plane.

The transmitter receiver assembly 14, 15 is connected, as previously, to a wave generator 7, receiver amplifier 8, rectifier 10 and telephones 11. Thus when the antenna assembly is rotated until no sound is heard in the telephones 11, pointer 13 will indicate the deviation of the true course of the aircraft from its fore and aft axis. In that position the transmitter receiver assembly 16, 17 will be oriented to produce a maximum difference in frequency between transmitted and reflected waves.

A direct measure of this frequency difference may be obtained in a number of ways, for example, by the apparatus shown in Fig. 6. The transmitting antenna 16 is connected to the wave generator 7. The receiving antenna 17 is connected to a receiver amplifier 20, which may be similar to the receiver amplifier 8; and receiver amplifier 20 is connected to a rectifier 21, which may be similar to rectifier 10. A portion of the energy from the wave generator is fed into the receiver amplifier 20 by the coupling condenser 22. The output of rectifier 21 is connected across one pair of deflecting plates 23, 24 of a cathode ray tube 25. The other pair of deflecting plates 26, 27 of the cathode ray tube is supplied with an audio frequency from an audio oscillator 28 whose output may be varied in frequency by the variable condenser 29. If the condenser 29 be adjusted so as to produce a frequency equal to the beat frequency between transmitted and reflected waves, a stationary Lissajou pattern will appear on the screen of the cathode ray tube. Consequently the variable condenser 29 may be provided with a dial 30 calibrated directly in ground speed units, since the frequency of the beats between transmitting antenna 16 and receiving antenna 17, when the latter are in the position where maximum Doppler effect is obtained, is a direct measure of the ground speed.

In all of the above arrangements the transmitting and receiving reflectors are preferably arranged to have a directional beam characteristic directed toward the ground at an angle of approximately 45° with the vertical when plane is horizontal. The beat angle may vary somewhat depending upon conditions in each case; the angle of 45° represents a compromise between receiving a maximum amount of reflected energy and obtaining maximum frequency change due to the Doppler effect. In order to make it possible to determine the position of maximum or minimum frequency difference with reasonable accuracy, I prefer to use a transmitted frequency of approximately 3,000 megacycles. In this case the frequency change between the transmitted and reflected waves, due to the Doppler effect, will be approximately 3.166 cycles per second per mile per hour of plane speed when the beam is pointed directly forward or directly aft with respect to the true course over the ground.

It will be observed that the apparatus required to carry out my invention is relatively simple. Only conventional electrical units known to those skilled in the art are required. Some care must, however, be exercised to insure good shielding of the receiver antenna in order that the received reflected signal may be strong enough to permit comparison for the determination of frequency difference between it and the transmitted signal.

Having now described my invention, I claim:

1. Apparatus for determining the ground speed and direction of aircraft, including a support rotatable about an axis substantially perpendicular to the fore and aft axis of the aircraft, a transmitting antenna and a receiving antenna mounted on said support along a line perpendicular to said rotatable axis, a second transmitting antenna and a second receiving antenna mounted on said support along a line perpendicular to both said rotatable axis and said first line, means for rotating said axis, means for energizing both said transmitting antennae to radiate high frequency electromagnetic waves, means for indicating where said first transmitting and receiving antennae are positioned by rotation of said support so that the difference between the frequency of transmitted and reflected waves is zero, whereby said second transmitting and receiving antennae are positioned so that the difference between the frequency of transmitted and reflected waves is a maximum, means for indicating the direction of the line of said first antennae with respect to the fore and aft axis of the aircraft as a measure of the true direction of flight, and means for indicating the said maximum frequency difference as a measure of the true ground speed.

2. Apparatus for determining the ground speed and direction of aircraft comprising: a support rotatable about an axis substantially perpendicular to the fore and aft axis of the aircraft; a first directional transmitting antenna and a first directional receiving antenna mounted on said support along a first line perpendicular to said axis, said antennae being both directed in a first direction oblique to said axis; a second directional transmitting antenna and a second directional receiving antenna mounted on said support along a second line perpendicular to both said axis and said first line, said second antennae being both directed in a second direction oblique to said axis and at right angles to said first direction in a horizontal plane; means for rotating said axis, means for simultaneously energizing both of said transmitting antennae to radiate simultaneously two beams of electromagnetic waves in said two directions; means for indicating where said first transmitting and receiving antennae are positioned by rotation of said support so that the difference between the frequency of transmitted and reflected waves is zero, whereby said second transmitting and receiving antennae are positioned so that the difference between the frequency of transmitted and reflected waves is a maximum, means for indicating the direction of the line of said first antennae with respect to the fore and aft axis of the aircraft as a measure of the true direction of flight, and means for simultaneously indicating the said maximum frequency difference as a measure of the true ground speed.

3. A system completely contained in a craft for determining the speed and direction of said craft comprising means for producing a source of radiant energy, means for simultaneously transmitting said energy from a pair of directional radiators, a pair of directional receiving means one for each of said radiators for receiving the reflected components concurrently with said transmission, means for rotating all of said radiators simultaneously, and means for translating the received components into an indication of the speed and direction of said craft.

4. A system completely contained in a craft for determining the speed and direction of said craft comprising means for producing a source of radiant energy, means for simultaneously transmitting said energy from a pair of directional radiators, a pair of directional receiving means one for each of said radiators for receiving the reflected components concurrently with said transmission, said transmitting and receiving radiators having substantially the same radiation pattern, means for rotating all of said radiators simultaneously, and means for translating the plurality of received components into an indication of the speed and direction of said craft.

5. A system completely contained in a craft for determining the speed and direction of said craft comprising means for producing a source of radiant energy, means for simultaneously transmitting said energy from a pair of directional radiators, means for separately receiving a pair of reflected components concurrently with said transmission, means for rotating all of said radiators simultaneously, and means for translating the plurality of received components into an indication of the speed and direction of said craft.

6. A system completely contained in a craft for determining the speed and direction of said craft comprising means for producing a source of radiant energy, means for simultaneously transmitting said energy from a pair of directional radiators, a pair of directional receiving means one for each of said radiators for receiving a plurality of reflected components concurrently with said transmission, means for rotating all of said radiators simultaneously, and means for translating the plurality of received components into an indication of the speed and direction of said craft.

References Cited in the file of this patent

UNITED STATES PATENTS

| | | |
|---|---|---|
| 1,864,638 | Chilowsky | June 28, 1932 |
| 2,223,224 | Newhouse | Nov. 26, 1940 |
| 2,403,625 | Wolff | July 9, 1946 |
| 2,423,023 | Hershberger | June 24, 1947 |
| 2,426,228 | Mackta | Aug. 26, 1947 |

UNITED STATES PATENT OFFICE
Certificate of Correction

Patent No. 2,865,019                                                December 16, 1958

Bertram M. Harrison

It is hereby certified that error appears in the above numbered patent requiring correction and that the said Letters Patent should read as corrected below.

In the grant, lines 1 to 3, for "Bertram M. Harrison, of Wellesley Hills, Massachusetts," read —Bertram M. Harrison, of Wellesley Hills, Massachusetts, assignor to Raytheon Manufacturing Company, a corporation of Delaware,—; line 12, for "Bertram M. Harrison, his heirs" read —Raytheon Manufacturing Company, its successors—; in the heading to the printed specification, line 4, for Bertram M. Harrison, Wellesley Hills, Mass." read —Bertram M. Harrison, Wellesley Mills, Mass., assignor to Raytheon Manufacturing Company, a corporation of Delaware—.

Signed and sealed this 28th day of April 1959.

[SEAL]

Attest:
T. B. MORROW,
*Attesting Officer.*

ROBERT C. WATSON,
*Commissioner of Patents.*